May 4, 1965  S. VIDETIC  3,182,218
MOLDED BRUSH HOLDER PLATE
Filed Aug. 22, 1961  2 Sheets-Sheet 1

INVENTOR.
SILVAN VIDETIC
BY
Williams, David, Hoffmann & Jount
ATTORNEYS

May 4, 1965 S. VIDETIC 3,182,218
MOLDED BRUSH HOLDER PLATE
Filed Aug. 22, 1961 2 Sheets-Sheet 2

INVENTOR.
SILVAN VIDETIC
BY
Williams, David, Hoffmann & Just
ATTORNEYS

United States Patent Office 3,182,218
Patented May 4, 1965

3,182,218
MOLDED BRUSH HOLDER PLATE
Silvan Videtic, Wickliffe, Ohio, assignor to The Leece-Neville Company, Cleveland, Ohio, a corporation of Ohio
Filed Aug. 22, 1961, Ser. No. 133,120
17 Claims. (Cl. 310—239)

This invention relates to brush riggings for electrical machines and, as one of its objects, aims to provide a novel brush rigging employing a brush holder of molded plastic material which can be produced rapidly and economically and which is stronger and more reliable than brush holders heretofore available.

Another object is to provide novel brush rigging for an electrical machine wherein the brush holder comprises a one-piece molded plastic member which requires no machine work or fabricating operations thereon but is in a completed form and ready, as produced, for assembly into the machine other than the insertion of the usual brushes and springs into the holder.

A further object is to provide a novel brush holder having guide means so located and defined thereon that molding of the holder as a one-piece article in a completed form can be readily carried out.

Additionally, this invention provides a novel construction and method applying to a one-piece molded plastic brush holder having a body of platelike form, and guide slot means defined by portions of such body and moldable thereon by a method procedure using complemental mold portions which are retractable from the openings of the slot means by separating movement away from opposite sides of the body.

Other objects, novel characteristics and advantages of this invention will be apparent in the following detailed description and in the accompanying drawings forming a part of this specification and in which FIG. 1 is an end elevation of the commutator end of an electrical machine embodying the novel brush rigging, the machine being shown with an end housing section removed therefrom;

Figure 1:
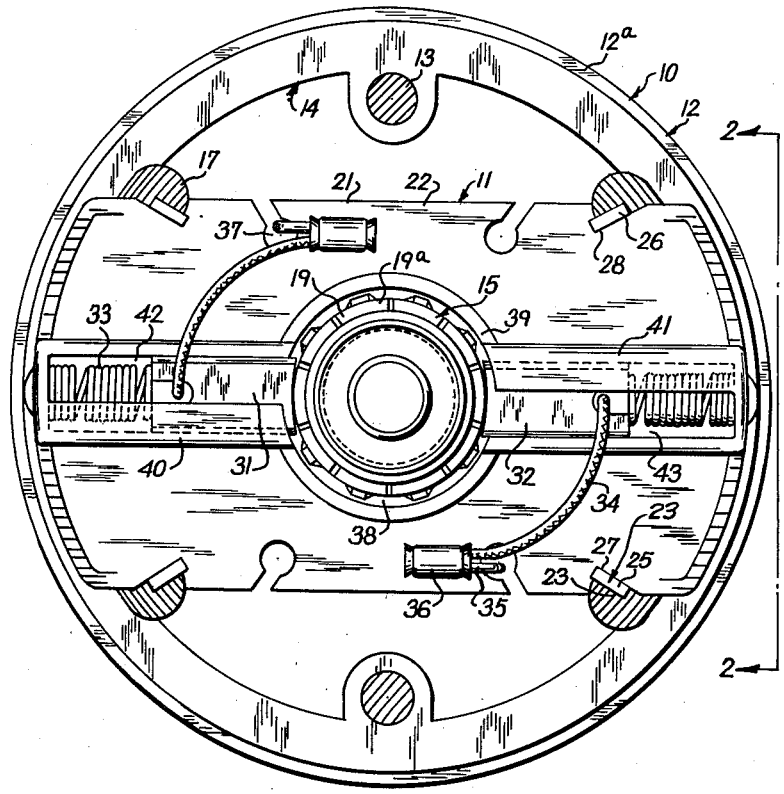
Figure 2:
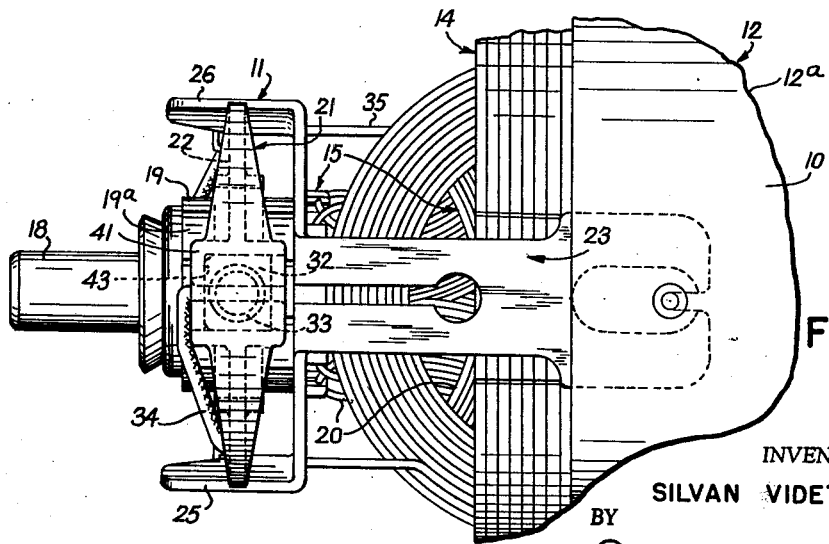
FIG. 2 is a fragmentary elevational view of the brush rigging and adjacent portions of the machine when viewed as indicated by the line 2—2 of FIG. 1.

In FIGS. 1 and 2 of the drawings an electric machine 10 is shown equipped with the novel brush rigging 11 of this invention. The machine 10 can be a dynamoelectric machine but is here shown as a motor and comprises, in general, a conventional housing 12 formed by a pair of cup-shaped complemental housing sections 12ᵃ connected by suitable bolts 13, and stator and rotor components 14 and 15 in an assembled position in such housing.

The stator 14 is a laminated stator of a conventional form having a field winding thereon comprising field coils 17. The rotor 15 is shown as being an armature having a shaft 18 and a commutator 19 secured thereon. The armature 15 is rotatably mounted in suitable bearings (not shown) provided in the housing sections 12ᵃ and includes an armature winding 20 having coils connected with the segments 19ᵃ of the commutator 19.

The brush rigging 11 comprises a brush holder 21 having a body 22 of a generally flat platelike form, and a pair of support brackets 23 connected with the stator 14 on diametrically opposite sides thereof and supporting the brush holder 21 with the platelike body 22 thereof lying substantially in a plane extending transverse to the rotation axis of the shaft 18. The brackets 23 support the brush holder so as to position the same at a point intermediate the ends of the commutator 19. The brush holder 21 may at times be referred to as a brush card.

The support brackets 23 are of identical construction and each one has a forked end comprising a pair of resiliently supported spaced arms 25 and 26. The pairs of arms 25 and 26 of the two support brackets extend axially of the machine 10 on opposite sides of the commutator 19, as shown in FIG. 1, and the arms of each pair are inclined in an inwardly converging relation with respect to the rotation axis. The brush holder 21 is supported in the housing 12 in the position referred to above by engagement of the pairs of arms 25 and 26 in pairs of notches 27 and 28 provided in the opposite edges of the platelike body 22.

The brush rigging 11 also includes a pair of brushes 31 and 32 slidably mounted in the brush holder 21, and springs 33 in engagement with the brushes and by which the inner ends of the brushes are maintained in engagement with the commutator 19. The brushes 31 and 32 have suitable conductor leads 34 of a flexible character extending therefrom, and the field coils 17 likewise have conductor leads 35 to which the brush leads 34 are attached by suitable connectors 36. The brush holder 22 is provided with suitable notched openings 37 to accommodate the coil leads 35.

The brush holder 21 and the manner of producing the same will now be described in greater detail. The platelike body 22 is provided with a central opening 38 of a size to receive the commutator 19 with suitable clearance therebetween. The portions of the body 22 extending around the opening 38 are suitably reinforced by pairs of arcuate flanges 39 projecting from the body on opposite sides thereof. On diametrically opposite sides of the opening 38 the body 22 is provided with guide passage means comprising substantially radially outwardly extending guideway portions or members 40 and 41 having guideway passages 42 and 43 in which the brushes 31 and 32 are slidably operable.

The brush holder 21 is formed as a one-piece molded member made of suitable plastic material of an electric insulating character and the production of the brush holder in accordance with the present invention involves a novel method procedure which will be described hereinafter. The guideway members 40 and 41 project from the platelike body 22 on both sides thereof and are provided respectively with slots 40ᵃ and 41ᵃ which communicate with the associated guideway passages 42 and 43 and through which the flexible brush leads 34 extend as shown in FIG. 1.

Alongside of the slots 40ᵃ and 41ᵃ and substantially coextensive therewith are flange elements 45 and 46 on the guideway members 40 and 41 which overhang the guideway passages 42 and 43 and form partial top walls for those passages. The guideway members 40 and 41 also comprise pairs of side walls 48 and 49 extending along the guideway passages 42 and 43 and projecting from the platelike body 22 in a substantially perpendicular relation thereto. The flange elements 45 and 46 are connected with the body 21 by the projecting wall portions 49 of the latter. The guideway members 40 and 41 also include end walls 50 and 51 at the outer ends of the guideway passages 42 and 43 and against which the outer ends of the brush springs 33 seat when the latter have been assembled in the guideway passages.

Figures 3, 5:
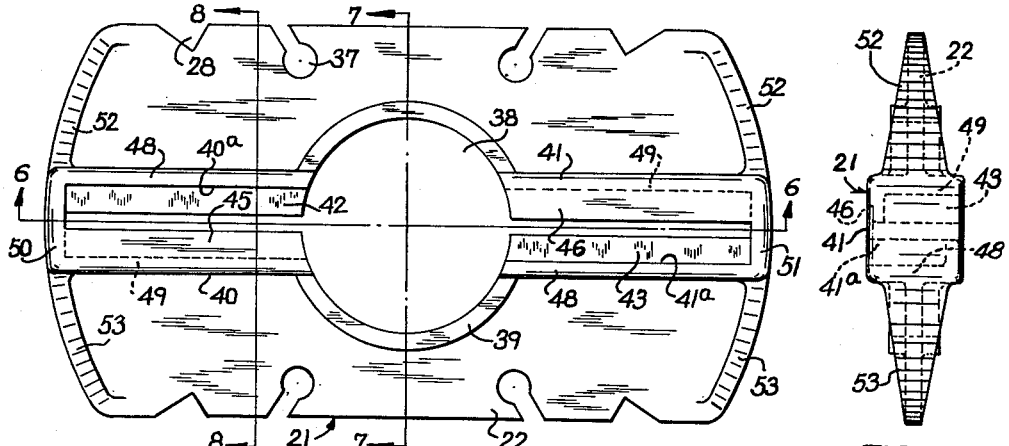
FIG. 3 is a plan view of the brush holder in a detached relation and with the brushes and springs omitted therefrom.
FIG. 5 is an end view thereof.

As best seen in FIGS. 3 and 5 to 8 inclusive, the overhanging top wall portions formed by the flange elements 45 and 46, and the associated slots 40$^a$ and 41$^a$, are disposed in a reversed or symmetrical relation on opposite sides of the opening 38, that is to say that, when the brush holder is viewed from one side thereof as seen in FIG. 3, the wall portion 45 on the left end of the brush holder is located below the slot 40$^a$ and the wall portion 46 on the right end of the brush holder is located above the associated slot 41$^a$. Similarly, on the side of the brush holder opposite from that presented to view in FIG. 3, the wall portion 45 on the left end of the brush holder lies above its associated slot 40$^a$ and the wall portion 46 on the right end of the brush holder lies below its associated slot 41$^a$.

Figure 7:
FIG. 7 is a transverse section through the brush holder taken on section line 7—7 of FIG. 3.
Figure 8:
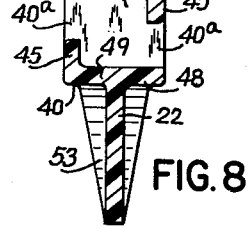
FIG. 8 is another transverse section through the brush holder taken on section line 8—8 of FIG. 3.

The wall portions 45 and 46 are of a width, transversely of the guideway passages 42 and 43, which is no greater than one-half of the transverse width of the guideway passages and, in this case, the wall portions 45 and 46 are actually of a width somewhat less than one-half the width of the guideway passages 42 and 43 as is clearly shown in FIGS. 3, 7 and 8. From the construction of the guideway members 40 and 41 as above described, it will accordingly be seen that the slots 40$^a$ and 41$^a$ thereof communicate with the guideway passages 42 and 43 on opposite sides of the body 22 but in a relatively reversed relation as shown in FIGS. 3, 7 and 8 so that the wall portions 45 and 46 extend toward each other from the opposed side walls 48 and 49 of the guideway passages.

The arrangement described above for the portions of the guideway members 40 and 41 renders the brush holder 21 reversible end-for-end and side-for-side inasmuch as the opposite end portions of the brush holder are symmetrical about the axis of the opening 38, whereby the brush holder can be quickly and easily installed in the machine 10 without any particular attention to the orientation thereof in the housing 12 and, since the openings 37 are provided in both edges of the body 22, these openings will always be in proper position to accommodate the leads 35 of the field coils 17.

Figure 4:
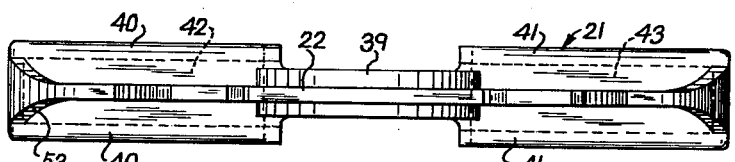
FIG. 4 is an edge view of the brush holder.
Figure 6:
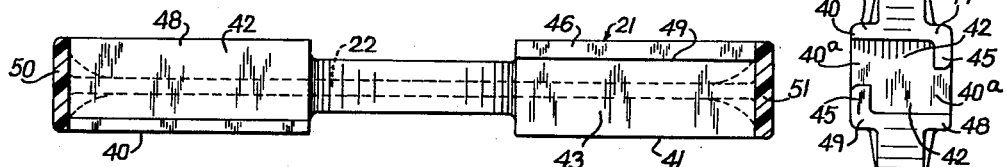
FIG. 6 is a sectional view taken through the brush holder longitudinally thereof on section line 6—6 of FIG. 3.

As was mentioned above, the brush holder 21 is produced as a molded one-piece plastic member whose guideway members 40 and 41 are integrally joined to the plate portion 22 and comprise projecting portions thereof. The body 22 is preferably reinforced and stiffened by pairs of curved riblike flanges 52 and 53 on the opposite sides of the end portions thereof, as shown in FIGS. 3, 4 and 8 and which flanges are of varying height and are disposed so that the high ends thereof are joined to the end portions of the guideway members 40 and 41 and the low ends merge with the flat side surfaces of the body portion 22 adjacent the side edges thereof.

Since the brush holder 21 is a one-piece molded member, the pairs of riblike flanges 52 and 53 comprise integral projections on the brush holder. The pairs of notches 28 and the pairs of openings 37 are formed in the edge portions of the body 22 during the molding operation which produces the brush holder 21.

Figure 9:
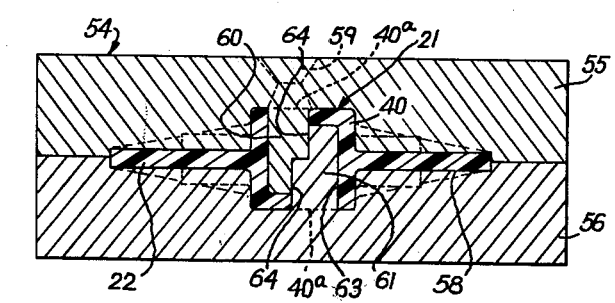
FIG. 9 is a transverse section of a somewhat diagrammatic form taken through mold apparatus and illustrating the method of producing the novel brush holder as a molded one-piece plastic member having integral guide slot means.

The method operation provided by this invention for producing the molded brush holder 21 is illustrated in FIG. 9 and utilizes mold means 54 comprising a pair of co-operating mold members 55 and 56 having relative closing and opening movements and being of a shape to define therebetween a mold cavity 58 when the mold members are in their closed position. The configurations of the mold members 55 and 56 on the adjacent sides thereof are such that the mold cavity 58 will have a shape corresponding with the configuration of the brush holder 21 so that when plastic molding material is introduced into the cavity, as by an injection molding procedure, the material will fill the cavity and upon solidification therein will result in a one-piece molded brush holder having the shape described above for the brush holder 21. The molding material can be introduced into the mold cavity 58 as through a suitable injection passage 59 provided in the mold member 57.

As an important feature of the novel method procedure, the mold members 55 and 56 are provided with projecting complemental portions 60 and 61 which extend into the mold cavity 58 from opposite sides thereof when the mold members are in their closed position. The dimensions of the mold member projections 60 and 61 correspond as to length and width with the dimensions of the slots 40$^a$ and 41$^a$ so that the presence of these projections in the mold cavity 58 results in the formation of these slots in the brush holder 21 being produced when the molding material solidifies.

The projections 61 and 62 each have a pair of flat parallel sides 63 and 64 thereon which are spaced apart a distance no greater than the width of the slots 40$^a$ and 41$^a$ so that these projections will be retractible through such slots of the molded brush holder 21 when the mold members 55 and 56 are separated at the completion of the molding operation. When the spacing of the parallel sides 63 and 64 of the projections 60 and 61 is exactly equal to one-half of the transverse width of the guideway passages 42 and 43, the sides 64 of the two projections will lie in a common plane which is the common midplane of the guideway passages 45 and 46 but, in this case as shown in FIG. 9, the sides 64 of the projections 60 and 61 are of a stepped configuration inasmuch as the projections and the slots 40$^a$ and 41$^a$ to be formed thereby are of a somewhat greater width than one-half the transverse width of the guideway passages 42 and 43. When the mold members 55 and 56 are in their closed position, the stepped configuration of the sides 64 are in an interfitting engagement as shown in FIG. 9 which will still permit free retraction of the projections from the slots of the brush holder 21 being produced.

From the accompanying drawings and the foregoing detailed description it will now be recognized that this invention provides novel brush rigging for an electrical machine and also provides a novel one-piece molded plastic brush holder as an important part of such brush rigging and which can be quickly and easily assembled into the machine. It will now also be recognized that when the brush holder 21 has the construction described above and is molded as a one-piece plastic member by the novel method procedure described above, the brush holder will be in a fully completed condition as the result of the molding operation and will not require any further shaping or machining operation thereon but will be immediately ready for assembly into the machine 10 by insertion of the same into the forked portions of the support brackets 23. The novel brush holder of this invention can accordingly be produced very rapidly and economically in large quantities and can be handled with great facility during the assembly thereof into the electrical machine. Additionally, it will be recognized that since the guideway members 40 and 41 of the brush holder are formed as integrally molded portions thereof, the brush holder will be very strong and durable and will be reinforced by the guideway members so that warping or other distortion will be substantially entirely prevented.

Although the novel brush rigging, novel brush holder and novel method of this invention have been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. In an electrical machine having stator means and rotor means including a commutator; a brush holder having an opening in which said commutator is receivable with running clearance; support means effective between said stator means and holder for supporting the latter substantially in a plane extending transverse to the rotation axis of the commutator; said holder comprising a molded plastic member having guide passage means in communication with said opening and extending outwardly therefrom; brush means slidable in said guide passage means; spring means effective against said brush means for urging the same into engagement with said commutator; said holder having a pair of opposed walls extending along said guide passage means and forming one pair of sides thereof; and overhang portions on said opposed walls and forming partial sides for said guide passage means on another pair of sides thereof.

2. An electrical machine as defined in claim 1 wherein each of said opposed walls has one of said overhang portions thereon and extending toward the wall opposite thereto; each of said overhang portions having a free edge spaced from the opposite wall by an intervening slot extending along said guide passage means as a side opening thereof.

3. An electrical machine as defined in claim 2 wherein said brush means has flexible lead means projecting from said guide passage means through the side opening thereof.

4. An electrical machine as defined in claim 2 wherein the width of said slot is at least equal to one-half of the width of said guide passage means.

5. An electrical machine as defined in claim 2 wherein the inner surfaces of said opposed walls are flat and lie in parallel planes; said overhang portions comprising flanges extending toward each other in offset planes and in a substantially normal relation to said parallel planes.

6. An electrical machine as defined in claim 2 wherein the inner surfaces of said opposed walls are flat and lie in parallel planes; said overhang portions comprising flanges extending toward each other in offset planes and in a substantially normal relation to said parallel planes; the slot edges remote from the associated flanges lying in said parallel planes so as to be flush with said inner surfaces.

7. A brush holder for an electrical machine comprising; a molded member made of plastic insulating material; said member having an opening in the intermediate portion thereof to accommodate a commutator, and guide passages adapted to receive brushes for co-operation with said commutator; said guide passages communicating with said opening and extending outward therefrom; said member having a pair of opposed walls extending along each guide passage and forming one pair of sides thereof; and overhang portions on said opposed walls and forming partial sides for the guide passages on another pair of sides thereof.

8. A brush holder as defined in claim 7 wherein said opposed walls are parallel; said member comprising a flat-plate body portion having said opposed walls joined thereto and projecting therefrom on opposite sides thereof.

9. A brush holder as defined in claim 7 wherein said overhang portions comprise one such overhang portion on each of said opposed walls; said overhang portions extending toward each other and lying in spaced parallel planes.

10. A brush holder as defined in claim 7 wherein said opposed walls are parallel; said member comprising a flat-plate body portion having said opposed walls joined thereto and projecting therefrom on opposite sides thereof; said overhang portions comprising flanges; there being one such flange on each of said opposed walls; the flange on each wall extending toward the wall opposite thereto and having a free edge spaced from such opposite wall by an intervening slot.

11. A brush holder as defined in claim 10 wherein the inner surface of each said opposite walls is flat, and the width of the associated intervening slot is at least equal to one-half the width of the guide passage means.

12. A brush holder for an electrical machine comprising; a member made of plastic insulating material and having a guide passage adapted to receive a brush therein for guided movement therealong; opposed parallel walls on said member and joined thereto and forming one pair of sides of said guide passage; said opposed walls having outer portions projecting from said member on opposite sides thereof; and a pair of flanges overhanging the guide passage comprising one flange on one side of said member and carried by an outer portion of one of said walls and extending toward the wall opposite thereto, and another flange on the other side of said member and carried by an outer portion of said opposite wall and extending toward said one wall; each said flange having a free edge spaced from the wall opposed thereto by an intervening slot; said member including said opposed walls and said flanges being a one-piece molded member, and said slots having a width at least equal to one-half the width of said guide passage for the withdrawal of mold portions in opposite directions from opposite sides of said member.

13. A brush holder as defined in claim 12 wherein said member comprises a flat-plate body portion having plate segments on opposite sides of said guideway passage and joined to said opposed walls on the remote sides of the latter.

14. A brush holder as defined in claim 13 wherein said plate segments lie in a common plane extending substantially normal to said opposed walls.

15. A brush holder as defined in claim 12 and comprising an abutment wall on said member usable as a spring seat and located at the outer end of said guideway passage.

16. A brush holder as defined in claim 13 wherein said plate segments lie in a common plane extending substantially normal to said opposed walls; and support flanges connected between said opposed walls and said plate segments for reinforcing the latter.

17. In a brush holder for an electrical machine having rotor means; a molded member made of plastic insulating material comprising flat-plate body means having an opening in an intermediate portion thereof for receiving said rotor means, and a pair of guide passages adapted to receive brushes and extending away from said opening and into end portions of said body means; a pair of opposed walls on each of said end portions and forming one pair of sides for one of said guide passages; and a pair of flanges overhanging each guide passage comprising one flange on one side of said member and carried by one of the pair of opposed walls associated with one of said guide passages and extending toward the wall opposite thereto, and a second flange on the other side of said member and carried by the other of said pair of opposed walls and extending toward said one wall; each said flange having a free edge spaced from the wall opposite thereto by an intervening slot communicating with the associated guide passage; said member including said body means, said opposed walls and said flanges comprising a one-piece molded member and said slots having a width at least equal to one-half the width of one of said guide passages for the withdrawal of mold portions in opposite directions from opposite sides of said member.

References Cited by the Examiner

UNITED STATES PATENTS

| | | | |
|---|---|---|---|
| 1,939,032 | 12/33 | Aufiero | 310—239 |
| 2,763,800 | 9/56 | Curley | 310—239 |
| 2,947,895 | 8/60 | Wray | 310—239 |
| 2,989,656 | 6/61 | Herbst | 310—239 |

MILTON O. HIRSHFIELD, *Primary Examiner.*